Dec. 3, 1929.    V. W. BUSCH    1,737,874
METHOD OF FORMING CELLULOID ARTICLES
Filed July 5, 1928    2 Sheets-Sheet 1

INVENTOR
Vern W. Busch
BY
*[signature]*
ATTORNEY

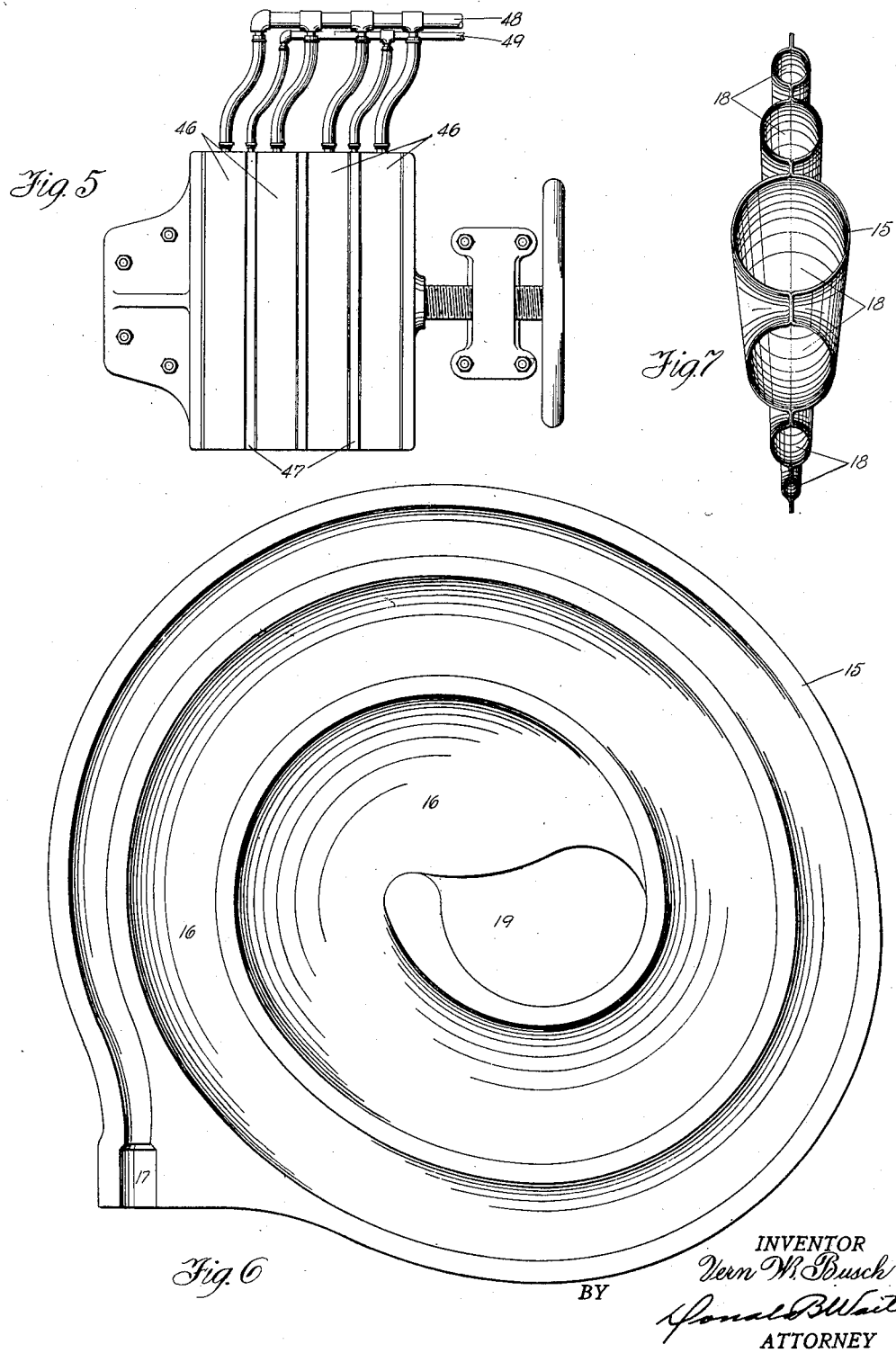

Patented Dec. 3, 1929

1,737,874

UNITED STATES PATENT OFFICE

VERN W. BUSCH, OF SOUTH BEND, INDIANA

METHOD OF FORMING CELLULOID ARTICLES

Application filed July 5, 1928. Serial No. 290,634.

This invention relates to the method of producing shaped articles of materials such as celluloid and pyralin, and particularly to the formation of cavities or depressions therein.

Celluloid and pyralin are not what may be termed plastic materials and it has always been very difficult in the past to provide depressions and passageways in materials of this nature. This is particularly true of this type of material which comes in sheet form. In another application the inventor has described a sound amplifying device which is comprised of two sheets of celluloid each of which is formed with a spiral groove of varying cross section, the thickness of the walls of which decrease as the area of the grooves are increased. When the two members are secured together, the grooves are disposed opposite to each other and form a continuous spiral passageway so that sound waves entering the passageway will be amplified. Considerable difficulty was experienced in finding a satisfactory method of forming the two members of this device. Hence, it is the principal object of this invention to provide a new, improved and economical means for forming grooves or passageways in sheet material composed of celluloid, pyralin or the like.

Another object is to provide a new and improved means for molding objects of celluloid and the like consisting in causing the material to occupy a mold cavity and remain in such position until the same hardens to allow removal of the same.

These being among the objects of the present invention the same consist of certain features of construction and combinations of parts to be hereinafter described with reference to the accompanying drawings and then claimed, having the above and other objects in view.

Broadly this invention consists in employing molds having the desired shape of the exterior of the article to be produced, the cavities therein being connected through suitable means to vacuum, steam and water sources. The sheet of celluloid or similar material is first prepared by soaking the same in water for a considerable length of time and is then placed over the mold and clamped in position. Steam is conducted to both sides of the sheet until the celluoid is sufficiently plastic to draw. The steam in the mold cavity is turned off and the vacuum is immediately turned on. This vacuum and the steam pressure on the opposite side of the celluloid sheet causes the material to be drawn into the mold and to be seated against the walls thereof. As soon as the article is completely formed, the steam at the side opposite the cavity side of the sheet is turned off and water is run thereinto to contact with the article to cool and set the same in its finished shape.

Referring to the accompanying drawings which illustrate a suitable device for forming hollow parts of celluloid and similar material, Figure 1 is a side elevation through the device for forming the hollow articles in accordance with the present invention, the mold therefor and a portion of the device being shown in section.

Figure 5 is a modified form of the device for forming the hollow article showing the arrangement for producing a quantity of objects at the same time.

Figure 6 is a plan view of one of the sections of the article showing the passageway formed therein.

Figure 7 is a small section thru the completed article showing the passageway therein.

Figure 1:
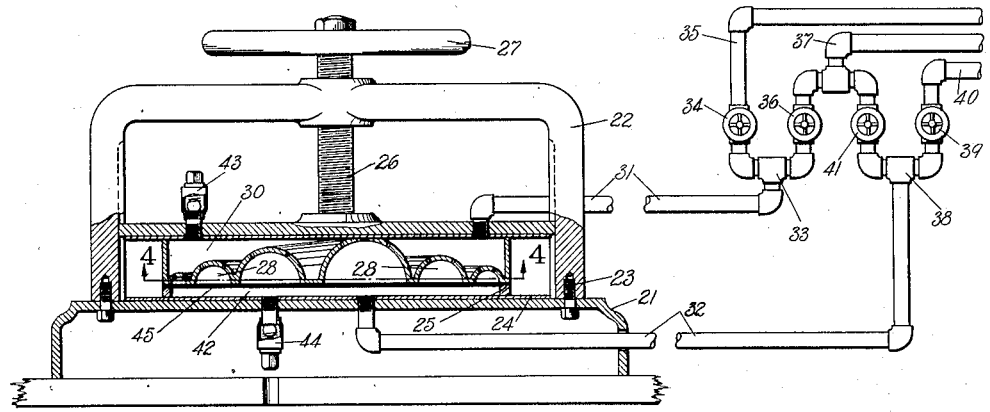

Referring to the accompanying drawings in which like numerals refer to like parts throughout the several views, the article to be produced is a sound amplifying device which is the subject matter of another application. It is to be plainly understood however that the present invention is not limited to the production of sound amplyfying horns only, as it is equally as adaptable to any article in which it is desired to form depressions or grooves. The sound amplifying device as shown in Figures 6 and 7 is constructed of two sections 15 suitable secured together. Each section is formed from a single piece of sheet celluloid and is provided with a semicircular groove 16 arranged in convolute form to have a minimum width at its entrance which gradually increases to a maximum at its outlet, the outlet being positioned adjacent to the central axis. As seen in Figure 7 the thickness of the walls of the grooves are greatest at the inlet 17 and gradually decreases as the width of the passageway 16 increases. After these two sections are secured together face to face the grooves 16 are in oppositely disposed relationship to each other to provide a spiral passageway 18 of circular cross section and a portion of the wall of the groove 16 in one of the sections 15 adjacent the inner end thereof is cut away to provide the discharge opening 19.

Each of the sections 15 is formed in a mold 20, shown in Figures 1 to 4 inclusive, which has a cavity or passageway 28 therein of the exact shape of the groove 16. The mold 20 is supported on a standard comprising an inverted dish-shaped base 21 having an upwardly extending inverted U-shaped arch 22 secured thereto by suitable bolts 23. A plate 24 having an annular ring 25 on its upper surface is supported by the upper surface of the base 21. The annular ring 25 is the main support for the mold 20 and a screw 26 having a hand wheel 27 is threaded through the base of the arch 23 to exert pressure against the mold 20 and clamp the same in position against the ring 25. The mold 20 is formed with a plurality of small openings in the walls of the passageway 29 leading to a hollow chamber 30. A flexible pipe 31 leads outwardly from this chamber 30 for a purpose about to be described.

A second pipe 32 also extends thru the base 21 and plate 24 to the space provided by the annular ring 25. The pipe 31 leads to a pipe tee 33, one side of which is connected through a valve 34 to a pipe 35 which is attached to a suitable vacuum source (not shown). The other side of this tee 33 is connected by a valve 36 and suitable joints to a steam pipe 37. The pipe 32 similarly leads to a tee 38, one side of which is connected by a valve 39 to a cold water pipe 40 and the other side thereof is also connected by a valve 41 to the steam pipe 37. The chamber 30 and the space 42 provided by the ring 25 are provided with safety valves 43 and 44 respectively, the purpose of which will be described later in the specification.

Figure 2:
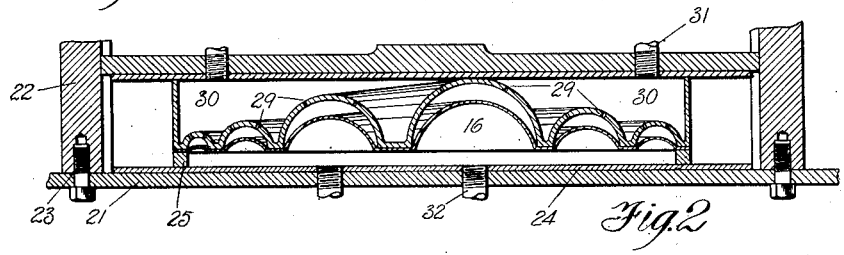
Figure 2 is an enlarged sectional view showing the mold and the article therein in partly formed state.
Figure 3:
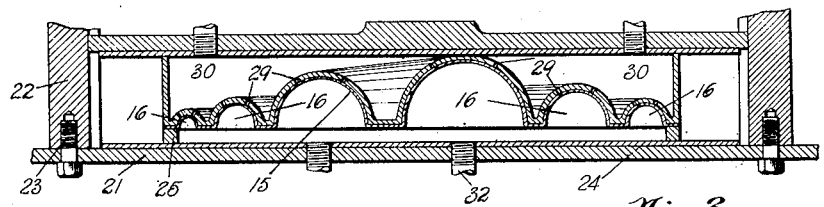
Figure 3 is an enlarged section similar to Figure 2 showing the article in completely formed state.
Figure 4:
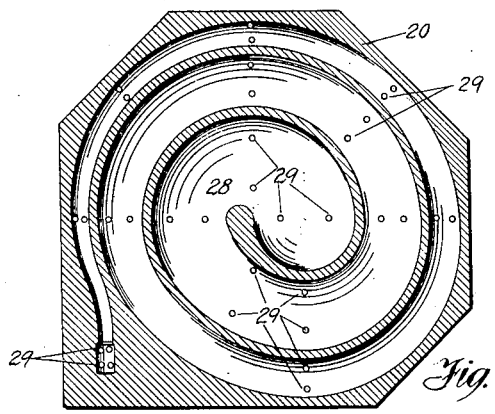
Figure 4 is a sectional view of the mold taken on the line 4—4 of Figure 1.

The sheet of celluloid 45 from which the article is to be made is first soaked in water which acts upon the pigment and is then placed upon the annular ring 25. The mold 20 is lowered to seat upon the sheet 45 and is clamped firmly against the same to provide air tight joints. The valves 36 and 41 in the steam line 37 are opened and steam enters the space 42 and chamber 30 and passes through the openings 29 into the mold cavity 28. The steam then is left in contact with both sides of the sheet 45 until the heat makes the same sufficiently plastic to be drawn. When the plastic point of the celluloid is reached, the valve 36 is closed and the valve 34 opened. This causes the air in the cavity 28, chamber 30 and pipe line 31 to be exhausted which produces a vacuum therein. The vacuum acting on this side of the celluloid sheet 45 and the steam pressure on the other side of the same causes the portions of the sheet adjacent the cavity 28 to be drawn in to the cavity 28 until the same successively assumes the positions shown in Figures 2 and 3. The steam engaging the lower side of the sheet 45 keeps the sheet pliable so that it can be easily drawn into the mold cavity 28. Figure 2 shows the same as it is partially drawn into the cavity. The stretching of the sheet causes the same to decrease in thickness as each successive higher point is reached. As soon as the celluloid completely engages the walls of the cavity the valve 41 is closed and the valve 39 in the water line 40 is opened which allows cold water to pass through the pipe 32 into the space 42 while maintaining the vacuum on the opposite side thereof and contact with the walls of the completely shaped section 15 to thoroughly cool the same.

After the section is thoroughly cooled, the valves 34 and 39 are then closed and the mold is then released and the shaped section is removed and quenched if necessary. The safety valves 43 and 44 are preferably provided to prevent excessive steam pressures.

Two of these devices are used, one for making the right hand member and one for the left hand member.

In Figure 5 a device is shown in elevation which can be used for making a plurality of articles at the same time the operation of which is identical with the method just described. The molds 46 and rings 47 may be made similar to the mold 20 and ring 25 previously described and may be connected by pipe lines 48 and 49 respectively to water steam and vacuum lines similar to those just described.

It is to be understood that the present invention is not limited to the process of producing a single article at one time but is adaptable to producing a multiplicity of articles at the same time.

It is to be further understood that formal changes may be made in the specific embodiment of the invention described without departing from the spirit and substance of the broad invention, the scope of which is commensurate with the appended claims.

What I claim is:—

1. The method of shaping a celluloid article consisting in clamping a celluloid sheet across a mold cavity, passing steam against both sides of said sheet to render the same plastic, drawing said sheet into said cavity by exhausting air from said cavity, and then hardening said article by passing water against the same while maintaining the vacuum in said cavity.

2. The method of shaping a celluloid article consisting in clamping a celluloid sheet across a mold cavity, rendering said sheet plastic by passing steam against both sides of the same, and in drawing said sheet into said cavity by exhausting the air therein while maintaining the steam on the opposite side of said sheet.

3. The method of shaping a celluloid article consisting in clamping a celluloid sheet across a mold cavity, rendering said sheet plastic by passing steam against both sides of the same, producing a partial vacuum in said cavity for drawing said sheet thereinto while maintaining the steam pressure on the opposite side thereof, and in hardening said formed article by passing cold water against the side opposite said mold cavity while maintaining said vacuum.

4. A device for shaping celluloid articles comprising a base, an annular ring supported by said base for supporting a celluloid sheet, a mold having a cavity therein adapted to clamp said sheet against said ring, a single means for admitting steam into said cavity and for exhausting air therefrom, and a single means for admitting steam and for admitting water into the space formed by said ring.

5. The method of forming an article of sheet celluloid or similar material, which includes clamping a celluloid sheet across a mold cavity, passing heat against both sides of said sheet to render the same plastic, creating a vacuum in said cavity while maintaining the heat on the opposite side of said sheet to draw said sheet into said cavity to shape said article, and hardening said formed article by cooling the same while maintaining said vacuum in said mold cavity.

Signed by me at South Bend this 30th day of June, 1928.

VERN W. BUSCH.